US012775484B2

(12) United States Patent
Victor et al.

(10) Patent No.: US 12,775,484 B2
(45) Date of Patent: Oct. 27, 2026

(54) SELECTION OF HOSTS FOR VIRTUAL MACHINES BASED ON CURRENT VIRTUAL MACHINE REQUIREMENTS AND HEADROOM AVAILABILITY

(71) Applicant: VMware LLC, Palo Alto, CA (US)

(72) Inventors: Prashanth Jonathan Victor, Sunnyvale, CA (US); Maarten Wiggers, Mountain View, CA (US); Sahan Bamunavita Gamage, San Jose, CA (US); Rajesh Venkatasubramanian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 621 days.

(21) Appl. No.: 18/332,221

(22) Filed: Jun. 9, 2023

(65) Prior Publication Data

US 2023/0401085 A1 Dec. 14, 2023

Related U.S. Application Data

(60) Provisional application No. 63/352,087, filed on Jun. 14, 2022.

(51) Int. Cl.
*G06F 9/455* (2018.01)

(52) U.S. Cl.
CPC .. *G06F 9/45558* (2013.01); *G06F 2009/4557* (2013.01); *G06F 2009/45591* (2013.01)

(58) Field of Classification Search
CPC ......... G06F 9/45558; G06F 2009/4557; G06F 2009/45591; G06F 9/5083
See application file for complete search history.

(56) References Cited

U.S. PATENT DOCUMENTS

| | | | | | |
|---|---|---|---|---|---|
| 8,601,483 | B2 * | 12/2013 | He | G06F 9/5083 718/104 |
| 11,138,049 | B1 * | 10/2021 | Featonby | G06F 11/3447 |
| 2011/0225299 | A1 * | 9/2011 | Nathuji | G06F 9/45558 718/1 |
| 2013/0346973 | A1 * | 12/2013 | Oda | G06F 9/4856 718/1 |
| 2016/0004552 | A1 * | 1/2016 | Innan | G06F 9/5088 718/1 |
| 2020/0065125 | A1 * | 2/2020 | Zheng | G06F 9/45558 |

* cited by examiner

*Primary Examiner* — Aimee Li
*Assistant Examiner* — Ivan Alexander Castaneda
(74) *Attorney, Agent, or Firm* — Kim & Stewart LLP

(57) ABSTRACT

Described herein are systems, methods, and software to manage the migration of virtual machines between hosts. In one example, a management service for a cluster of hosts identifies a virtual machine to migrate and identifies current resource requirements of the virtual machine and current resource availability at the hosts of cluster. The management service further determines that two or more of the hosts possess current resource availability to support the current resource requirements of the virtual machine and identifies available headroom resources on each of the two or more hosts. Based on the available headroom resources, the management service further selects a host from the two or more hosts and initiates a migration of the virtual machine to the selected host.

15 Claims, 5 Drawing Sheets

SELECTION OF HOSTS FOR VIRTUAL MACHINES BASED ON CURRENT VIRTUAL MACHINE REQUIREMENTS AND HEADROOM AVAILABILITY

RELATED APPLICATIONS

This application is related to and claims priority to U.S. Provisional Patent Application No. 63/352,087, entitled "SELECTION OF HOSTS FOR VIRTUAL MACHINES BASED ON CURRENT VIRTUAL MACHINE REQUIREMENTS AND HEADROOM AVAILABILITY," filed on Jun. 14, 2022, and which is hereby incorporated by reference in its entirety.

BACKGROUND

In computing environments, host computing systems (hosts) support a platform for the execution of virtual machines. Hosts can include a hypervisor that abstracts the physical components of the host and provides abstracted hardware to the executing virtual machine, wherein the virtual machine may include its own operating system and software that uses the abstracted hardware. Hosts can further provide networking for the virtual machines that permits the virtual machines to communicate with each other and other computing nodes. The networking can include routing, switching, firewalls, or some other networking operation.

In some examples, load balancing is required to distribute the execution of virtual machines within a computing environment. Specifically, to limit physical resource constrains associated with the various hosts, the virtual machines can be distributed across the hosts of the computing environment. However, difficulties can arise in selecting a host for each virtual machine and maintaining the required service level associated with the virtual machine, wherein the service level may include processing resources, memory resources, and the like.

SUMMARY

The technology described herein manages the selection of hosts for virtual machines based on current virtual machine requirements and headroom availability on the hosts. In one implementation, a management service identifies a virtual machine to migrate in a cluster of hosts and identifies a current availability associated with each host in the cluster of hosts. The management service further determines when two or more hosts in the cluster of hosts are associated with a current availability that satisfies criteria to support the virtual machine. When two or more hosts are associated with a current availability that satisfies the criteria, the management service selects a host from the two or more hosts based on resource headroom availability on the two or more hosts. After selection, the management service migrates the virtual machine to the selected host.

In an implementation, the management service identifies current resource requirements for a set of virtual machines and selects the virtual machine for migration from the set of virtual machines based on the current resource requirements for the virtual machine satisfying migration criteria.

In an implementation, the management service identifies current resource requirements for a set of virtual machines and identifies that the set of virtual machines do not have current resource requirements that satisfy migration criteria. The management service further identifies the virtual machine for migration from the set of virtual machines based on a headroom requirement associated with the virtual machine.

DETAILED DESCRIPTION

Figure 1:
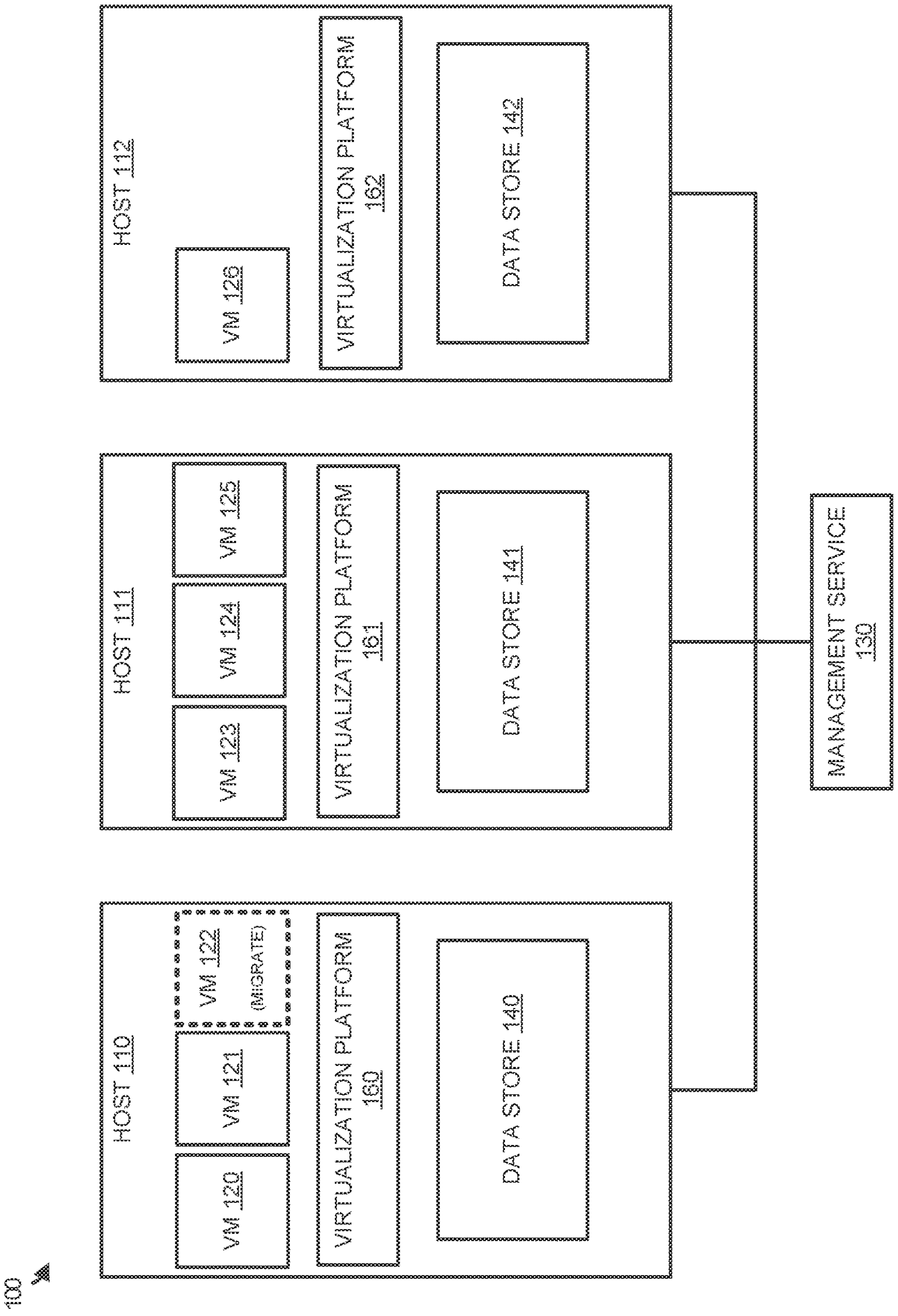
FIG. 1 illustrates a computing environment for selecting hosts for virtual machines according to an implementation.

FIG. 1 illustrates a computing environment 100 for selecting hosts for virtual machines according to an implementation. Computing environment 100 includes hosts 110-112 and management service 130. Hosts 110-112 further include virtual machines 120-126, virtualization platforms 160-162, and data stores 140-142. Although demonstrated with three hosts, computing environments may deploy any number of hosts as a cluster. Management service 130 can be deployed as one or more standalone computers or can be deployed wholly or partially on hosts 110-112. Data stores 140-142 may be used to store virtual disk files, configuration files, or other data for the virtual machines. In some examples, data stores 140-142 represent a distributed file system that can store data accessible to the various virtual machines.

In computing environment 100, virtualization platforms 160-162 provide a platform for the execution of virtual machines 120-126. Virtualization platforms 160-162 are representative of hypervisors that can abstract physical components of hosts 110-112 and provide the abstracted components to virtual machines 120-126. The abstracted components can comprise processing resources, memory resources, network resources, and the like. Virtualization platforms 160-162 may further provide networking operations for virtual machines 120-126 including routing, switching, firewall, or other similar networking operations.

Here, management service 130 is provided that can orchestrate the deployment and migration of virtual machines in computing environment 100. When a request is received to deploy a virtual machine, such as virtual machine 122, management service 130 can select a host from hosts 110-112 and initiate the virtual machine on the selected host. Management service 130 can select the host based on resource requirements of the virtual machine and the current availability of resources on the host. In at least one examples, management service 130 will select a host based on ability of the host to support the maximum potential load of the virtual machine. If multiple hosts can support the virtual machine, management service can select a host randomly, based on the host with the most available resources, or based on some other factor.

After a virtual machine is deployed in computing environment 100, management service 130 determines when a virtual machine is required to be migrated from a first host to a second host. In one implementation, management service 130 may identify when a virtual machine is not receiving currently required resources. For example, management service 130 initially deploys virtual machine 122 in host 110. However, during the execution of virtual machine 122, host 110 may be unable to accommodate the current resource requirements of virtual machine 122, wherein the resource requirements can include processor resources, memory resources, networking resources, and the like. As an example, host 110 may be incapable of providing the requisite clock cycles to virtual machine 122 due to resources being allocated to other virtual machines or processes. Accordingly, management service 130 may select an alternative host for virtual machine 122.

In selecting the new host for a virtual machine, management service 130 can identify current resource availability associated with the hosts 110-112 in computing environment 100 and can compare the current resource requirements for virtual machines 122. The current resource availability and the current resource requirements can include processing system or processor resources, memory resources, networking resources, or some other resource. The current resource requirements and current resource availability associated with the virtual machine and the hosts can be provided periodically to management service 130, can be provided when the virtual machine is selected for migration, or can be provided at some other interval. In some implementations, management service 130 may generate a score for each of the hosts as a function of the current resource availability in relation to the current resource requirements. The score can be numerical, a letter grade, or some other score. Once calculated the score can be used to select the host to support the virtual machine. For example, if a score were created on a scale of 0 (incapable of supporting the virtual machine) to 100 (a host capable of fully supporting the current resource requirements of the virtual machine), management service 130 can select the host with the highest score and initiate an operation to migrate the virtual machine 122 to the corresponding host.

In some examples, management service 130 identifies multiple hosts capable of servicing the migrating virtual machine. For example, for virtual machine 122, management service 130 can identify that both hosts 111-112 can support virtual machine 122. In response to identifying that hosts 111-112 can support the virtual machine, management service 130 further identifies the headroom to support virtual machine 122 and currently executing virtual machines on the corresponding host. Thus, for host 112, management service 130 identifies remaining or surplus resources available to virtual machine 126 and virtual machine 122 if both were deployed on the same host. The available headroom availability can consider potential future requirements of the virtual machines deployed on the host, including maximum resource loads possible for each of the virtual machines. In some implementations, the available headroom resources can be represented as a score that incorporates the various resources for the host into a single score that can be compared to other hosts. In other examples, each resource can be compared individually between hosts to determine which of the hosts provides better resource headroom to support the virtual machine. Returning to the example of virtual machine 122, management service 130 compares available headroom resources at hosts 111-112 and determines which of the hosts would have more headroom for the virtual machine (and other virtual machines on the host). The host with the most headroom can be selected to support the virtual machine, and management service 130 can initiate the operation to migrate the virtual machine from host 110 to the selected host.

In at least one implementation, the headroom can be identified based on historical resource usage associated with the virtual machines and processes in the cluster. Specifically, the surplus resources for each of the hosts can be determined based on the historical resource usage and can represent available resources as a function of time. A host with best headroom that can support migrating virtual machine 122 and the other virtual machines and processes on the host, can be selected by management service 130. The host with the best headroom can be the host with resources for virtual machine 122 for the longest period (e.g., host 112 can support virtual machine 122 for at least a day based on the historical usage information, while host 111 can support virtual machine 122 for an hour), the host can be selected from a set of hosts that can provide headroom resources for a period, or can be selected in some other manner. For example, management service 130 can select host 112 over host 111 for virtual machine 122 when host 112 has surplus headroom to support virtual machine 122 (and other virtual machines and processes) for a longer period than host 111.

Figure 2:
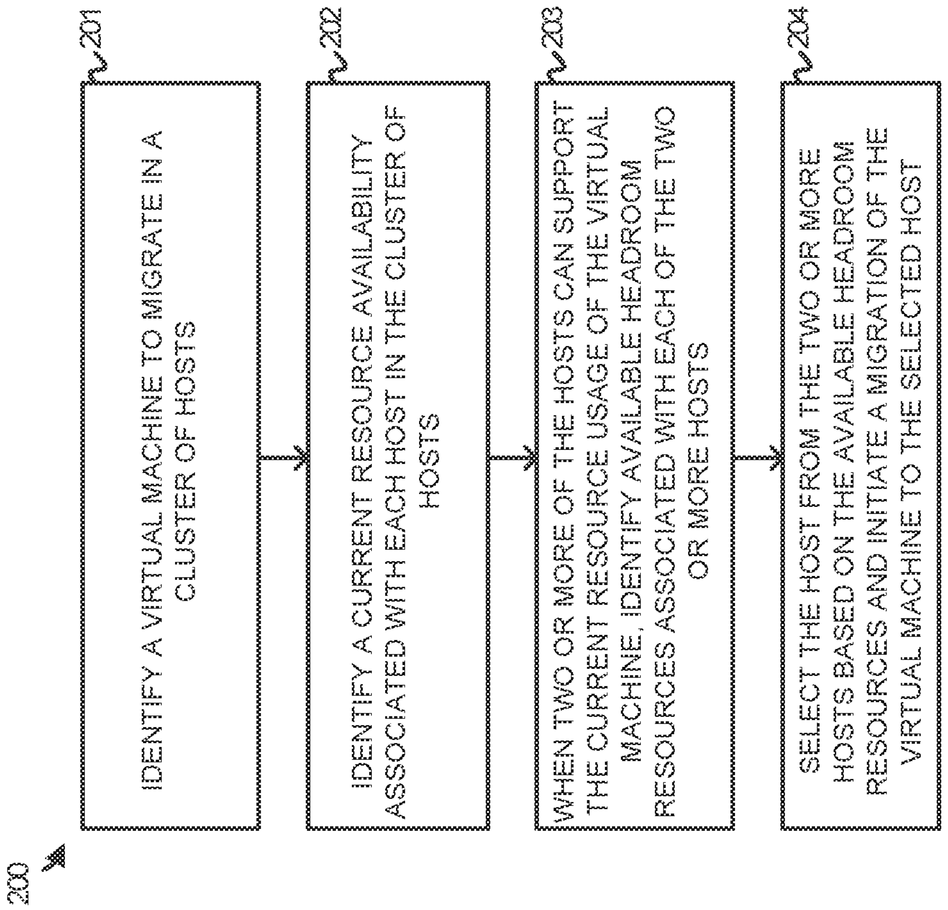
FIG. 2 illustrates a method of operating a management service to select a host for a virtual machine according to an implementation.

FIG. 2 illustrates a method 200 of operating a management service to select a host for a virtual machine according to an implementation. The steps of operation 200 are referenced parenthetically in the paragraphs that follow with reference to systems and elements of computing environment 100 of FIG. 1.

Method 200 includes identifying (201) a virtual machine to migrate in a cluster of hosts. Method 200 further includes identifying (202) current resource availability associated with each host in the cluster of hosts. The current resource availability can include processor resource availability, memory resource availability, network resource availability, or some other physical resource availability. Once the current resource availability is identified, method 200 further provides, when a two or more of the hosts can support the current resource usage of the virtual machine, identifying (203) available headroom resources associated with each of the two or more hosts.

In some implementations, management service 130 can identify current resource requirements associated with the virtual machine and can compare the current resource requirements to the current resource availability on each of the hosts. The comparison can be used to generate a score, wherein the score can be based on required processor resources in relation to available processor resources, can be based on required memory resources in relation to available memory resources, or can be based on some other relationship between the current resource requirements of the virtual machine and the available resources on each of the hosts. The score can be a numerical value, a grade, or some other metric. A host that can support all the current resource requirements for the virtual machine can be assessed the highest score.

When two hosts are not identified as capable of supporting the current resource requirements of the virtual machine, management service 130 can determine whether the current host for the virtual machine or a new host can provide a better quality of service for the virtual machine. For example, when virtual machine 122 is identified for migration, management service 130 can determine whether host 110 or another host of hosts 111-112 can provide a better quality of service. The better quality of service can correspond to the host with the best score assessed in relation to the current resource requirements and the current available resources at the host. When the current host is identified, the virtual machine will not be migrated. However, when a different or new host is identified, the virtual machine will be migrated.

In examples where multiple hosts can support the current resource requirements of the virtual machine, the hosts are evaluated to identify available or surplus headroom resources on each of the two or more hosts. The available headroom resources correspond to the resources available on the host for the virtual machine to support an increased load of the virtual machine. For example, while the current resource usage of the virtual machine may use a fourth of the maximum resources of the virtual machine, the headroom resources can be used to determine how much of the maximum resource requirements would be available to the virtual machine on the new host.

Using the example migration of virtual machine 122, management service 130 can identify that hosts 111-112 are associated with current resource availability that satisfies the current resource requirements of virtual machine 122. Management service 130 can identify available headroom resources on each host of hosts 111-112, wherein the available headroom resources correspond to resources available on the host for increased load of the virtual machine (i.e., surplus resources). Once the available headroom resources are identified, method 200 further includes selecting (204) a host from the two or more hosts based on the available headroom resources and initiates a migration of the virtual machine to the selected host. In some examples, the host with the most headroom is selected. In other examples, when multiple hosts can support the maximum load of the virtual machine, the host can be randomly selected, can be selected based on the overall headroom for the host, or can be selected in some other manner.

In at least one example, in identifying the headroom associated with the hosts of the cluster, management service 130 can identify potential resource requirements associated with the migrating virtual machine and determine which of the hosts provides headroom that can support the potential resource requirements. Accordingly, while a virtual machine can currently use a fourth of the maximum resources allocated to the virtual machine, the potential resource requirements of the virtual machine in conjunction with the overhead availability on the hosts can be used to select the host. The overhead availability can also consider possible increases in load on the various hosts that correspond to other virtual machines and processes executing on the host.

In some implementations, in identifying the available headroom associated with hosts with current availability to support the resource requirements of the virtual machine, management service 110 can consider resource usage information associated with the different virtual machines in the cluster. Specifically, as resource usage information is obtained for the virtual machines, the resource usage information can be used in determining that amount of headroom at each of the hosts. The resource usage information can include historical data to identify trends associated with resource usage associated with each of the virtual machines, such as processor resource usage, memory resource usage, and the like. Advantageously, management service 110 can predict the available headroom at each of the hosts as a function of time, wherein a first host may provide headroom for a first period (i.e., have enough resources for all processes and virtual machines), a second host may provide headroom for a second period. Management service 110 can select a host that has headroom to support the virtual machines and processes for a period. For example, management service 130 can select a host from hosts 111-112 for virtual machine 122 based on a host satisfying a duration length of headroom for virtual machine 122. The length could be an hour, a day, or some other length. Alternatively, management service 130 can select the host with the longest predicted duration for available headroom to support the migrating virtual machine and any other processes and virtual machines on the host.

In some implementations, an administrator of computing environment 100 can specify a policy for the migration of virtual machines. For example, a first policy can comprise a conservative balancing policy that will migrate virtual machines only when a current host cannot satisfy the resource requirements of the virtual machine. However, a second policy can comprise a more aggressive balancing policy that can migrate a virtual machine if the predicted resource requirements within a threshold period (e.g., hour) are predicted to exceed the available resources on a current host. Advantageously, when the more aggressive policy is invoked, virtual machines will be migrated prior to requiring the additional resources based on the predicted requirements for some future period (e.g., the next hour).

Figure 3:
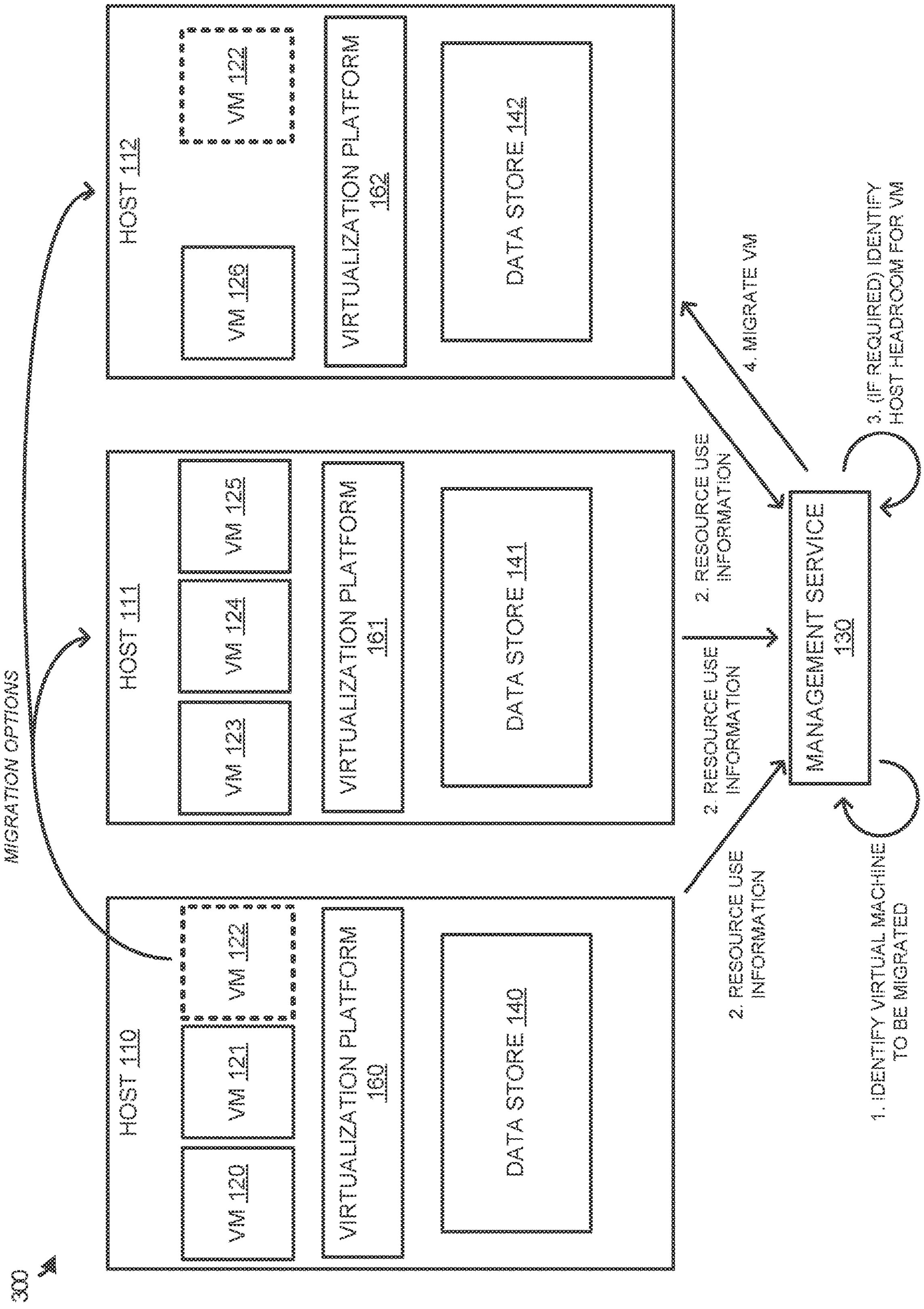
FIG. 3 illustrates an operational scenario of migrating a virtual machine from a first host to a second host according to an implementation.

FIG. 3 illustrates an operational scenario 300 of migrating a virtual machine from a first host to a second host according to an implementation. Operational scenario 300 includes systems and elements from computing environment 100 of FIG. 1. Although demonstrated as migrating virtual machine 122, similar operations can be used to migrate any other virtual machine in computing environment 100.

In operational scenario 300, management service 130 identifies, at step 1, a virtual machine to be migrated. The virtual machine can be identified based on the current resource availability for each of the virtual machines in relation to the current resource usage for each of the virtual machines. Using the example of operational scenario 300, virtual machine 122 can be selected based on virtual machine 122 possessing the largest discrepancy between the current resource usage and the current resource availability on host 110. In some examples, hosts 110-112 can all support the current resource requirements of virtual machines 120-126. When the current resource requirements are met by hosts 110-112 (i.e., no current issue in providing resources), management service 130 can identify the potential resource requirements associated with virtual machines 120-126 to determine a virtual machine that could potentially encounter limited resources after an increased load. The potential resource requirements can be compared to the current available resources on the corresponding host to determine whether a migration is required. If potential resource requirements can be satisfied in the current configuration, then no virtual machine is selected for migration. In contrast, if one or more virtual machines can encounter an issue with the potential resource requirements and the overhead provided by a current host, the virtual machine with the largest discrepancy between the potential resource requirements and the headroom can be selected for migration. Alternatively, the virtual machine with the highest quality of service can be selected in some examples. The headroom can be calculated based on the potential resource requirements associated with the virtual machine as well as the potential resource requirements for other virtual machines and processes executing on the host. The headroom can account for an increase in load for all the processes, not just the virtual machine being evaluated.

After the virtual machine is selected for migration, management service 130 obtains resource use information at step 2. The resource use information includes current resource requirements associated with the migrating virtual machine and current resource availability for hosts 110-112. Management service 130 can then determine whether two or more hosts can support the current resource requirements for the virtual machine. When multiple hosts can support the current resource requirements, management service 130 identifies available headroom resources on the two or more hosts, wherein the headroom resources can be used to support the virtual machines and other processes on the host during an increase in load for the virtual machines and processes. For example, the headroom resource information for host 112 may indicate remaining resources available to be provided to virtual machine 122 if both virtual machine 126 and virtual machine 122 required an increase load. The increase in load for each of the virtual machines can correspond to the maximum resources available to the virtual machine, can correspond to historical maximum resources used by the virtual machines, or can correspond to some other model of possible increased load. Referring to the example of host 112, management service 130 can determine the quantity of resources that would be available to virtual machine 122 during a maximum load of virtual machine 126 and virtual machine 122. Management service 130 may also use historical data associated with the load generated by each virtual machine to determine the overhead that could be available to virtual machine 122 during migration.

Here, management service 130 selects host 112 to support virtual machine and initiates a migration of virtual machine 122 from host 110-112. In initiating the migration, management service 130 can communicate with one or more hypervisors or a hypervisor manager to migrate the virtual machine between the hosts.

In some implementations, two hosts can be incapable of supporting the current resource requirements of the virtual machine. In these examples, management service 130 can determine whether the current host for the virtual machine provides a better quality of service than another host in the cluster. To determine the quality of service, management service 130 can generate a score for each of the hosts that reflects the current resource requirements of the virtual machine in view of the current resource availability on the host for the virtual machine. For example, if virtual machine 122 required a first number of clock cycles of a processor of host 110, but host 110 were able to provide a second number of clock cycles, a score can be generated that demonstrates the relationship between the required and the available clock cycles. The score can also consider memory resources, networking resources, and the like. Once the score is generated for each of the hosts, management service 130 can select a host based on the score. If the score indicated that host 110 provides the best quality of service, then host 110 can continue to support the virtual machine. If the score indicates that either host 111 or host 112 provides the best quality of service, then management service 130 can initiate the migration of virtual machine 122 to the selected host. Advantageously, the virtual machine can be placed on the host with the most available resources for the virtual machine.

In some implementations, in identifying the host headroom for the hosts with the current resource availability, management service 130 can monitor historical resource usage associated with the virtual machines and processes on hosts 111-112. The historical resource usage can include processor resource usage, memory resource usage, and the like. From the historical resource usage, management service 130 can determine predicted headroom associated with each host as a function of time. For example, while host 111 can support virtual machine 122 for a first period, host 112 can support virtual machine for a second period based on the predicted headroom. In some examples, management service 130 can select the host with headroom for the longest predicted duration. In other examples, management service 130 can select a host with headroom for a predicted duration that satisfies a length criterion (e.g., a day, hour, and the like). For example, management service 130 can select host 112 for virtual machine 122 based on the headroom for host 112 having the longest predicted duration of supporting virtual machine 122. Advantageously, by predicting the length that headroom can support the virtual machine, future migration requirements can be limited.

Figure 4:
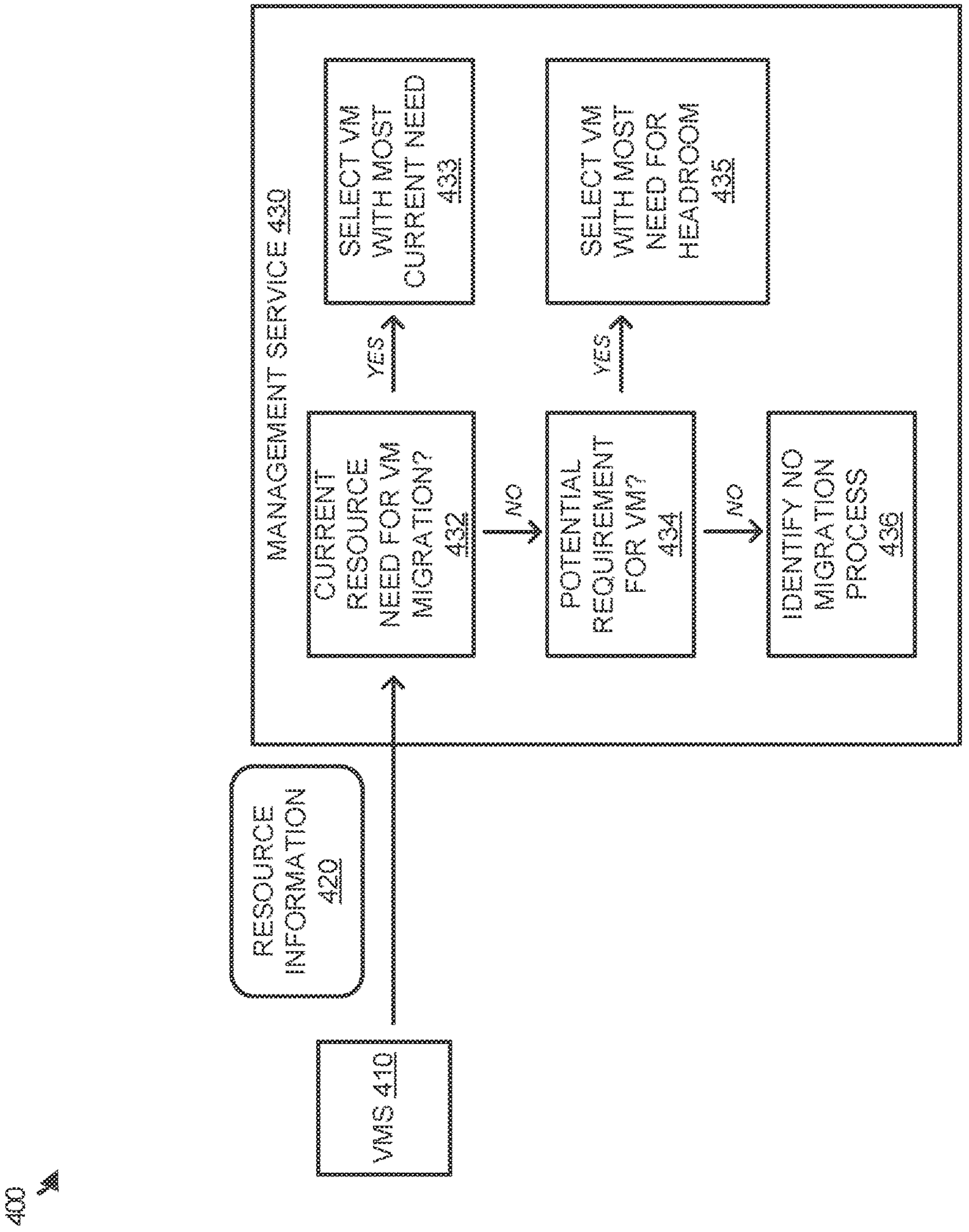
FIG. 4 illustrates an operational scenario of selecting a virtual machine for migration according to an implementation.

FIG. 4 illustrates an operational scenario 400 of selecting a virtual machine for migration according to an implementation. Operational scenario 400 includes virtual machines 410, resource information 420, and management service 430. Management service 430 is an example of management service 130 from FIG. 1, although other examples can exist. Management system 430 may comprise one or more computers with at least one processor and memory to support the various operations. Management service 430 provides at least operations 432-436 that are described below and referenced parenthetically.

In operational scenario 400, management service 430 receives resource information 420 associated with virtual machines 410. Resource information 420 includes current resource availability associated with current hosts for virtual machines 410 and current resource requirements associated with virtual machines 410. Based on resource information 420, management service determines (432) whether there is a current need for a virtual machine migration from a first host to a second host. The determination can be based on a comparison of the current required resources for each virtual machine in relation to the current resource availability to each virtual machine. If the current resources available do not satisfy the requirement of the virtual machine (e.g., if a virtual machine requires a larger number of clock cycles than the current host can provide), management service selects (433) the virtual machine of virtual machines 410 with the greatest current need to be migrated. In some examples, as an alternative to selecting the virtual machine with the greatest need, or greatest different between current resource requirements and current resources available, management service 430 may select the virtual machine with the highest quality of service assigned to the virtual machine. For example, while two virtual machines may not receive the required resources from a current host, the virtual machine selected for migration can be the virtual machine with the highest quality of service assessed by an administrator of the computing environment. The migration of the selected virtual machine can be implemented via the operations described in FIGS. 1-3.

If the virtual machines in the computing environment are receiving resources that match the current resource requirements for the virtual machines, then operational scenario 400 determines (434) whether there is a headroom requirement associated with one or more of the virtual machines. A headroom requirement corresponds to the potential resources that could be required by a virtual machine during the execution of the virtual machine. For example, while a virtual machine in virtual machines 410 currently uses first processor resources, the virtual machine can be configured to potentially use second processor resources when one or more applications on the virtual machine require the resources. Management service 430 can determine whether the overhead resources (i.e., unused resources of the current host) are enough to satisfy the virtual machine and any other process on the same host. If all hosts in the cluster include enough headroom resources for the virtual machines, management service 430 can identify (436) that no migration process is required, as all virtual machines are receiving and can receive the required resources for operation.

In contrast, when one or more of the virtual machines does not have the requisite headroom resources on a current host, management service 430 can select (435) the virtual machine with the most need for headroom resources. For example, while a first virtual machine can require an additional one gigabyte of memory more than the available headroom on a current host, a second virtual machine can require an additional five gigabytes of memory more than the available headroom on its current host. Accordingly, management service 430 can select the second virtual machine for migration. Alternatively, rather than monitoring the additional resources required (e.g., memory or processor resources over the current available overhead on the current host), management service 430 can monitor and use the percentage of additional resources that are required above the current overhead to select a virtual machine for migration. As an example, if a first virtual machine required 15 percent additional memory resources above what a first host can provide, and a second virtual machine required 30 percent additional resources above what a second host can provide. Then, the second virtual machine can be selected for migration. In some examples, a score can be allocated for each virtual machine that indicates the additional resources required in relation to the available headroom at the current host. The scores can then be compared to determine a virtual machine for migration, wherein the virtual machine with the score that indicates the greatest need for additional resources can be selected.

In some implementations, multiple virtual machines can be identified that require the same additional headroom. To select a virtual machine for migration, management service may randomly select a virtual machine from the set of virtual machines with equal requirements, may select a virtual machine with a higher allocated quality of service, or can select the virtual machine in some other manner.

After selecting the virtual machine and initiating the migration process, management service 430 can repeat operations 432-436 periodically, after a request from the administrator associated with the cluster, or at some other interval. For example, management service 430 can evaluate resource information 420 at periodic intervals to determine whether a migration is required for a virtual machine. Additionally, if a virtual machine is migrated, management service 430 can immediately repeat operations 432-436 to determine whether any additional virtual machines should be migrated. The operations can be repeated as necessary until no further virtual machines require migration. Then, management service 430 can return to the periodic checks for migrating virtual machines.

In some implementations, an administrator of a computing environment can specify a policy for the migration of virtual machines. For example, a first policy can comprise a conservative balancing policy that will migrate virtual machines only when a current host cannot satisfy the resource requirements of the virtual machine. However, a second policy can comprise a more aggressive balancing policy that can migrate a virtual machine if the predicted resource requirements within a threshold period (e.g., hour) are predicted to exceed the available resources on a current host. Advantageously, when the more aggressive policy is invoked, virtual machines will be migrated prior to requiring the additional resources based on the predicted requirements for some future period (e.g., the next hour).

Figure 5:
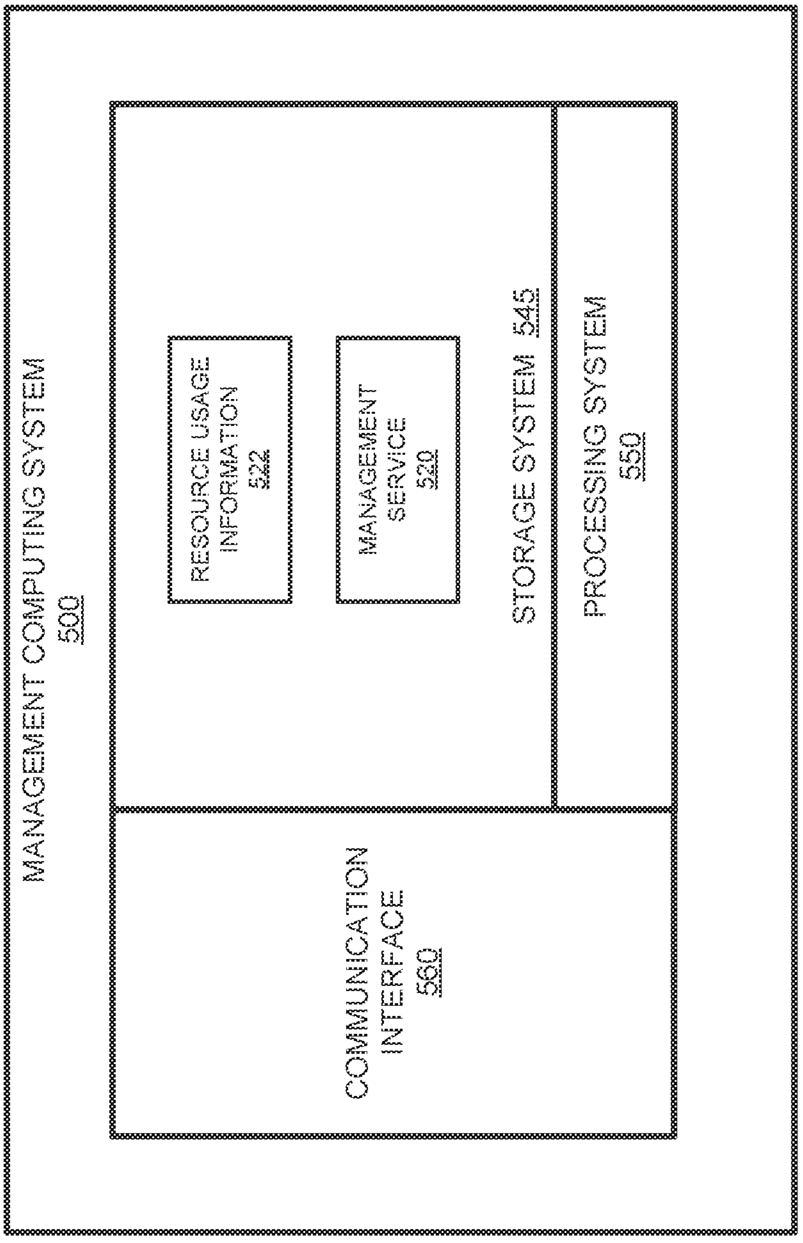
FIG. 5 illustrates a management computing system that selects hosts for virtual machines according to an implementation.

FIG. 5 illustrates a management computing system 500 that selects hosts for virtual machines according to an implementation. Management computing system 500 is representative of any computing system or systems with which the various operational architectures, processes, scenarios, and sequences disclosed herein for management service can be implemented. Management computing system 500 is an example of management service 130 and 430, although other examples may exist. Management computing system 500 includes storage system 545, processing system 550, and communication interface 560. Processing system 550 is operatively linked to communication interface 560 and storage system 545. Communication interface 560 may be communicatively linked to storage system 545 in some implementations. Management computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with one or more hosts in a computing environment. Communication interface 560 can also communicate with one or more management systems, client systems, or outside computers to manage the various hosts of a cluster.

Processing system 550 comprises microprocessor and other circuitry that retrieves and executes operating software from storage system 545. Storage system 545 may include volatile and nonvolatile, removable, and non-removable media implemented in any method or technology for storage of information, such as computer readable instructions, data structures, program modules, or other data. Storage system 545 may be implemented as a single storage device but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises resource usage information 522 and management service 520. The operating software on storage system 545 may further include an operating system, utilities, drivers, network interfaces, applications, or some other type of software. When read and executed by processing system 550 the operating software on storage system 545 directs management computing system 500 to operate as a management service described herein in FIG. 1-5.

In at least one implementation, management service 520 directs processing system 550 to identify a first virtual machine to migrate in a cluster of hosts. In some examples, an administrator can select a virtual machine for migration. In other implementations, management service 520 directs processing system 550 to identify a difference, for each virtual machine, between the current resource availability at the current host for the virtual machine and the current resource requirements of the virtual machine. This difference can be represented as a score that incorporates memory resources, processing resources, or some other resources for the virtual machine. Management service 520 directs processing system 550 to select a virtual machine for migration based on the differences, wherein the virtual machine with the largest difference in resource availability and requirement can be selected. If multiple virtual machines have the same difference in resource availability and requirements, then the virtual machine selected for migration can be selected randomly, selected based on a quality of service assessed to the virtual machines, or based on potential resource requirements associated with the virtual machines as described herein and the following paragraph.

If none of the virtual machines currently require additional resources (or two or more virtual machines require the same resources), management service 520 can direct processing system 550 to identify potential resource requirements associated with the virtual machines in the cluster. The potential resource requirements can include potential processor requirements, potential memory requirements, and the like. For example, a virtual machine can currently use a first quantity of processor resources but could later require a second quantity of processor resources that is greater than the first. For example, the virtual machine may be at a fifth of the overall available load for the virtual machine, and management computing system 500 can determine that the virtual machine has the potential to use five times the resources. Once the potential resource requirements are identified for the virtual machines in the cluster, management service 520 directs processing system 550 to select a virtual machine for migration based on the potential resource requirements for the virtual machines.

In some implementations, management service 520 directs processing system 550 to identify headroom on each of the hosts and determine whether the potential resource requirements for the virtual machine can be satisfied based on the headroom. The headroom may factor total available resources, the currently used resources of the various virtual machines and processes on the host, the potential resource usage of the different virtual machines and processes, or some other factor. The potential resource usage can be calculated based on a maximum quantity of resources allocated for the virtual machine or can be determined based on historical resource usage data associated with the virtual machine, wherein the historical resource usage data can monitor the resources required by the virtual machine. The virtual machine with the largest difference between the potential resource usage and the headroom of the current host can be selected for migration. Thus, management service 520 can use a two-step process for selecting the migrating virtual machine. The first step identifies the virtual machine with the most current need for migration based on current resource requirements. The second step, when necessary, selects the virtual machine for migration based on the potential resource requirements for the virtual machine.

After the virtual machine is selected, management service 520 directs processing system 550 to identify current resource requirements associated with the first virtual machine and identify current resource availability associated with each host in the cluster of hosts. The current resource requirements and resource availability information can be obtained from the virtual machine or hypervisor associated with the virtual machine, can be obtained from the hosts, or can be obtained in some other manner. The information can be provided periodically or can be obtained in response to identifying that a virtual machine migration is required.

Management service 520 further directs processing system 550 to determine whether two or more hosts in the cluster are associated with current resource availability that satisfies the current resource requirements of the virtual machine. When two or more hosts are not available, management service directs processing system 550 to determine whether a new host or the current host better supports the current resource requirements of the virtual machine. When the current host better supports the virtual machine, no migration may be performed for the virtual machine. However, if another host can fully support the current resource requirement of the virtual machine (or improve the available resources to the virtual machine), management service 520 can direct processing system 550 to initiate the migration of the virtual machine to the new host. The migration can include notifying one or more hypervisors of the migration, a hypervisor manager, or some other service in association with the virtual machines.

In some implementations, when two or more hosts can support the resource requirements of the virtual machine, management service 520 directs processing system 550 to monitor and maintain predicted resource requirements associated with virtual machines and processes in the cluster. The predicted resource requirements can be used to identify headroom associated with each of the hosts, wherein the headroom can indicate the available resources of the host as a function of time. Management service 520 can direct processing system 550 to identify the host with the headroom associated with the longest duration for the virtual machine to support the virtual machine. For example, a first host can provide headroom for the virtual machine for an hour, while a second host can provide headroom for the virtual machine for a day. As a result, management service 520 directs processing system 550 to select the second host to migrate the virtual machine. In some implementations, management service 520 can migrate the virtual machine to any host that provides a minimum predicted duration of headroom for the virtual machine. The minimum predicted duration can be selected by an administrator of the cluster or can be selected in some other manner.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

identifying a first virtual machine to migrate in a cluster of hosts;

identifying current resource availability associated with each host in the cluster of hosts;

identifying current resource requirements associated with the first virtual machine;

determining that two or more hosts in the cluster of hosts are associated with the current resource availability that satisfies the current resource requirements of the first virtual machine;

based on historical resource usage associated with the first virtual machine and one or more additional virtual machines executing in the cluster of hosts, identifying available headroom resources on each of the two or more hosts, the available headroom resources on each of the two or more hosts comprising a supporting duration of time during which the host is predicted to maintain sufficient resources for the first virtual machine if the first virtual machine were migrated to the host;

selecting a host with a longest supporting duration of time from the two or more hosts based on comparison of the supporting durations of time of the two or more hosts; and initiating a migration of the first virtual machine to the selected host.

2. The method of claim 1 further comprising:

identifying current resource requirements associated with one or more additional virtual machines executing in the cluster of hosts;

identifying, for each virtual machine of the first virtual machine and the one or more additional virtual machines, a difference between the current resource requirements for the virtual machine and currently available resources for the virtual machine on a current host in the cluster of hosts; and wherein identifying the first virtual machine to migrate in the cluster of hosts comprises selecting the first virtual machine from the first virtual machine and the one or more additional virtual machines based on the differences.

3. The method of claim 1 further comprising:

identifying current resource requirements associated with one or more additional virtual machines executing in the cluster of hosts;

determining whether currently available resources provided to the first virtual machine and the one or more additional virtual machines in the cluster of hosts satisfy the current resource requirements;

in response to determining that the currently available resources provided to the first virtual machine and the one or more additional virtual machines in the cluster of hosts satisfy the current resource requirements, identifying potential resource requirements associated with the first virtual machine and the one or more additional virtual machines; and wherein identifying the first virtual machine to migrate in the cluster of hosts comprises selecting the first virtual machine from the first virtual machine and the one or more additional virtual machines based on the potential resource requirements.

4. The method of claim 1, wherein the current resource requirements comprise at least processor resources and memory resources.

5. The method of claim 1, wherein the available headroom resources on each of the two or more hosts comprises at least surplus processor resources and surplus memory resources available on each of the two or more hosts if the first virtual machine were migrated to the host.

6. A computing apparatus comprising:

a storage system;

a processing system operatively coupled to the storage system; and program instructions stored on the storage system that, when executed by the processing system, direct the processing system to:

identify a first virtual machine to migrate in a cluster of hosts;

identify current resource availability associated with each host in the cluster of hosts;

identify current resource requirements associated with the first virtual machine;

determine that two or more hosts in the cluster of hosts are associated with the current resource availability that satisfies the current resource requirements of the first virtual machine;

based on historical resource usage associated with the first virtual machine and one or more additional virtual machines executing in the cluster of hosts, identify available headroom resources on each of the two or more hosts, the available headroom resources on each of the two or more hosts comprising a supporting duration of time during which the host is predicted to maintain sufficient resources for the first virtual machine if the first virtual machine were migrated to the host;

select a host with a longest supporting duration of time from the two or more hosts based on comparison of the supporting durations of time of the two or more hosts; and initiate a migration of the first virtual machine to the selected host.

7. The computing apparatus of claim 6, wherein the program instructions further direct the computing apparatus to:

identify current resource requirements associated with one or more additional virtual machines executing in the cluster of hosts;

identify, for each virtual machine of the first virtual machine and the one or more additional virtual machines, a difference between the current resource requirements for the virtual machine and currently available resources for the virtual machine on a current host in the cluster of hosts; and wherein identifying the first virtual machine to migrate in the cluster of hosts comprises selecting the first virtual machine from the first virtual machine and the one or more additional virtual machine based on the differences.

8. The computing apparatus of claim 6, wherein the program instructions further direct the computing apparatus to:

identify current resource requirements associated with one or more additional virtual machines executing in the cluster of hosts;

determine whether currently available resources provided to the first virtual machine and the one or more additional virtual machines in the cluster of hosts satisfy the current resource requirements;

in response to determining that the currently available resources provided to the first virtual machine and the one or more additional virtual machines in the cluster of hosts satisfy the current resource requirements, identify future potential resource requirements associated with the first virtual machine and the one or more additional virtual machines; and wherein identifying the first virtual machine to migrate in the cluster of hosts comprises selecting the first virtual machine from the first virtual machine and the one or more additional virtual machines based on the potential resource requirements.

9. The computing apparatus of claim 6, wherein the current resource requirements comprise at least processor resources and memory resources.

10. The computing apparatus of claim 6, wherein the available headroom resources on each of the two or more hosts comprises at least surplus processor resources and surplus memory resources available on each of the two or more hosts if the first virtual machine were migrated to the host.

11. A system comprising:

a cluster of hosts;

a management computer communicatively coupled to the cluster of hosts and configured to:

identify a first virtual machine to migrate in the cluster of hosts;

identify current resource availability associated with each host in the cluster of hosts;

identify current resource requirements associated with the first virtual machine;

determine whether two or more hosts in the cluster of hosts are associated with the current resource availability that satisfies the current resource requirements of the first virtual machine;

in response to determining that two or more hosts in the cluster of hosts are not associated with current resource availability that satisfies the current resource requirements of the first virtual machine:

determine whether a new host in the cluster of hosts or a current host in the cluster of hosts provides a higher quality of service for the first virtual machine based on the current resource requirements associated with the first virtual machine and the current resource availability associated with each host in the cluster of hosts;

when the current host provides a higher quality of service, continue execution of the first virtual machine on the current host; and when a new host provides a higher quality of service, initiate a migration of the first virtual machine from the current host to the new host;

in response determining that two or more hosts in the cluster of hosts are associated with current resource availability that satisfies the current resource requirements of the first virtual machine:

based on historical resource usage associated with the first virtual machine and one or more additional virtual machines executing in the cluster of hosts, identify available headroom on each of the two or more hosts, the available headroom resources on each of the two or more hosts comprising a supporting period of time during which the host is predicted to maintain sufficient resources for the first virtual machine if the first virtual machine were migrated to the host;

select a host with a longest supporting duration of time from the two or more hosts based on comparison of the supporting periods of time of the two or more hosts; and initiate a migration of the first virtual machine to the selected host.

12. The system of claim 11, wherein the management computer is further configured to:

identify current resource requirements associated with one or more additional virtual machines executing in the cluster of hosts;

identify, for each virtual machine of the first virtual machine and the one or more additional virtual machines, a difference between the current resource requirements for the virtual machine and currently available resources for the virtual machine on a current host in the cluster of hosts; and wherein identifying the first virtual machine to migrate in the cluster of hosts comprises selecting the first virtual machine from the first virtual machine and the one or more additional virtual machine based on the differences.

13. The system of claim 11, wherein the management computer is further configured to:

identify current resource requirements associated with one or more additional virtual machines executing in the cluster of hosts;

determine whether currently available resources provided to the first virtual machine and the one or more additional virtual machines in the cluster of hosts satisfy the current resource requirements;

in response to determining that the currently available resources provided to the first virtual machine and the one or more additional virtual machines in the cluster of hosts satisfy the current resource requirements, identify future potential resource requirements associated with the first virtual machine and the one or more additional virtual machines; and wherein identifying the first virtual machine to migrate in the cluster of hosts comprises selecting the first virtual machine from the first virtual machine and the one or more additional virtual machines based on the potential resource requirements.

14. The system of claim 11, wherein the current resource requirements comprise at least processor resources and memory resources.

15. The system of claim 11, wherein the available headroom resources on each of the two more hosts comprise at least processor resources and memory resources.

* * * * *